United States Patent [19]

Fung et al.

[11] Patent Number: 4,491,635

[45] Date of Patent: * Jan. 1, 1985

[54] REACTIVATING IRIDIUM AND SELENIUM CONTAINING CATALYSTS WITH HYDROGEN HALIDE AND OXYGEN

[75] Inventors: Shun C. Fung, Bridgewater; Walter Weissman, Berkeley Heights; James L. Carter, Westfield; Walter S. Kmak, Scotch Plains, all of N.J.

[73] Assignee: Exxon Research & Engineering Co., Florham Park, N.J.

[*] Notice: The portion of the term of this patent subsequent to Apr. 24, 2001 has been disclaimed.

[21] Appl. No.: 547,874

[22] Filed: Nov. 2, 1983

Related U.S. Application Data

[63] Continuation-in-part of Ser. No. 374,978, May 5, 1982, Pat. No. 4,444,897.

[30] Foreign Application Priority Data

May 4, 1983 [FI] Finland ................................ 831532
May 4, 1983 [JP] Japan ................................ 58-78847

[51] Int. Cl.³ .................... B01J 27/30; B01J 23/96; B01J 27/02; C10G 35/085
[52] U.S. Cl. ........................ 502/37; 204/140
[58] Field of Search ............... 502/35, 36, 37, 38, 502/52; 208/140

[56] References Cited

U.S. PATENT DOCUMENTS

| 3,622,520 | 11/1971 | Hayes | 252/415 |
|---|---|---|---|
| 3,625,860 | 12/1971 | Condrasky | 252/415 |
| 3,904,510 | 9/1975 | Sinfelt et al. | 208/140 |
| 3,937,600 | 2/1976 | Yates et al. | 208/140 |
| 3,939,061 | 2/1976 | Paynter et al. | 208/140 |
| 3,939,062 | 2/1976 | Sinfelt et al. | 208/140 |
| 3,941,682 | 3/1976 | Kmak et al. | 208/140 |
| 3,941,716 | 3/1976 | Paynter | 252/415 |
| 3,943,052 | 3/1976 | Kmak et al. | 208/140 |
| 3,981,823 | 9/1976 | Yates | 252/415 |
| 4,046,673 | 9/1977 | Paynter et al. | 208/140 |
| 4,159,938 | 7/1979 | Lewis | 208/139 |
| 4,166,046 | 8/1979 | Eberly, Jr. | 502/215 |
| 4,169,043 | 9/1979 | Eberly, Jr. | 502/215 |
| 4,172,817 | 10/1979 | Yates et al. | 208/140 |
| 4,265,786 | 5/1981 | Eberly, Jr. et al. | 502/215 |
| 4,359,400 | 11/1982 | Landolt et al. | 252/415 |

FOREIGN PATENT DOCUMENTS

| 0057551 | 11/1982 | European Pat. Off. |
| 2257337 | 8/1975 | France . |
| 2290953 | 11/1975 | France . |
| 1484372 | 9/1977 | United Kingdom . |
| 1516518 | 7/1978 | United Kingdom . |

*Primary Examiner*—P. E. Konopka
*Attorney, Agent, or Firm*—Robert J. North; Edward H. Mazer

[57] ABSTRACT

A process is disclosed for reactivating an agglomerated iridium and selenium containing catalyst and particularly platinum-iridium-selenium on alumina reforming catalysts. The process includes contacting a substantially decoked agglomerated catalyst with a reducing gas such as hydrogen to reduce agglomerated iridium oxides present to the free metal, a hydrogen halide pretreatment step to increase the halogen level of the catalyst to about 1.3 weight percent and above, and a redispersion step involving hydrogen halide and elemental oxygen. Use of hydrogen halide and elemental oxygen in the redispersion treatment eliminates the need for use of elemental chlorine gas. If no iridium oxides are initially present, the hydrogen reduction step is optional.

21 Claims, No Drawings

REACTIVATING IRIDIUM AND SELENIUM CONTAINING CATALYSTS WITH HYDROGEN HALIDE AND OXYGEN

CROSS REFERENCE TO RELATED APPLICATIONS

This application is a continuation-in-part application of copending Ser. No. 374,978, filed May 5, 1982, now U.S. Pat. No. 4,444,897.

BACKGROUND OF THE INVENTION

This invention relates to a process for reactivating agglomerated iridium-containing catalysts also containing a selenium hydrocracking moderator agent, which can be partially or completely decoked in which the catalyst is reduced, if iridium oxides are present, pretreated with a halide-providing compound preferably hydrogen chloride and contacted with hydrogen halide and elemental oxygen to redisperse the metal on the catalyst surface.

SUMMARY OF THE INVENTION

Small amounts of selenium as the metals, salt, or compound thereof, are known to significantly improve higher octane $C_{5+}$ liquid product yields of an iridium-containing catalyst during reforming operations as described in U.S. Pat. No. 4,166,046, hereby incorporated by reference. Selenium can thus be used in place of a conventional sulfiding step to reduce the hydrocracking activity of the reforming catalyst. However, whether or not the catalyst is presulfided or contains selenium during the reforming operation, a progressive decline in catalyst activity occurs due in part to the formation of carbonaceous residues on the catalyst surface. Conventional regeneration and redispersion methods applicable to platinum containing reforming catalysts for removing the carbonaceous deposits and restoring catalyst activity are not satisfactory when applied to iridium containing catalysts and result in incomplete restoration of catalyst activity.

It has been found that iridium-containing catalysts containing agglomerated metallic iridium and/or iridium oxides and a selenium hydrocracking moderator agent can be efficiently redispersed and reactivated by the use of a mixture of hydrogen halide and elemental oxygen. The redispersion step in this manner is performed subsequent to a halide pretreatment, following decoking and reduction of the metal oxides, if present. Temperature of the redispersion is conducted generally in the range of about 450° to 600° C. with volume ratios of elemental oxygen/hydrogen halide in the range of about 1:5 to 100:1. Redispersion by the subject process generally leads to metal redispersion values of about 75 percent to 100 percent.

The halide pretreatment step is conducted with two limitations, (1) that about 1.3 weight percent halide and above, and preferably 1.4 to 2.5 weight percent halide, based on the coke-free, dry catalyst, and most preferably saturated with halide under the conditions used, is present on the catalyst after the pretreatment and maintained at, or above this level up to, and during the subsequent hydrogen halide/oxygen redispersion step, and (2) that during the halide pretreatment step, no elemental oxygen is present in the feedstream or is generated, in situ. If this halide level is not maintained during subsequent redispersion and if elemental oxygen is present during the pretreatment, then substantially lower redispersion values will be obtained with concomitant decrease in catalyst metal surface area and activity.

The subject process is applicable to a wide variety of iridium and selenium containing catalysts and particularly to reforming catalysts employing platinum-iridium-selenium on alumina, which are completely or partially decoked.

Generally, halide-providing compounds are used in the pretreatment step, including organic halides and hydrogen halides with gaseous hydrogen chloride being the preferred hydrogen halide-providing compound used in the pretreatment and chloride levels of about 1.3 weight percent and above on the catalyst surface are necessary to insure effective subsequent redispersion. The halide weight percent is expressed on the basis of the dry, coke-free catalyst.

The pretreatment step is generally conducted in the temperature range of about 250° to 600° C., and the halide weight percentage can be monitored, for example, by X-ray fluorescence versus known standards. Generally, with the exception of very severely coked and agglomerated iridium-containing catalyst, the subject process is capable of producing substantially decoked, highly redispersed, iridium-containing catalyst in a one-cycle treatment.

In accordance with this invention, there is provided a process for reactivating a partially or completely decoked agglomerated catalyst containing metallic iridium and selenium comprising the steps of:

(a) pretreating said iridium and selenium-containing catalyst by contact with substantially elemental oxygen-free atmosphere comprising a halide-providing compound at elevated temperature, to provide about $\frac{1}{2}$ weight percent and above halide to the catalyst, based on the coke-free, dry catalyst; and (b) redispersing the metallic iridium from step (a) while maintaining said 1.3 weight percent halide provided to the catalyst, by contact with an atmosphere comprising hydrogen halide and elemental oxygen at elevated temperature, at an oxygen:hydrogen halide volume ratio of about 1:5 to 100:1 and a hydrogen halide partial pressure of about 0.00005 to 0.1 MPa for a time sufficient to effect a substantial redispersion of said metallic iridium.

A further embodiment of the process is where the agglomerated catalyst further initially contains iridium oxide which is contacted with a reducing atmosphere at elevated temperature to substantially convert said iridium oxide to metallic iridium prior to or concurrently with, step (a).

DESCRIPTION OF THE INVENTION AND PREFERRED EMBODIMENTS

The novel process of the present invention includes a halide pretreatment step prior to a hydrogen halide/oxygen redispersion step. This combination of steps in sequence enhances the potential of the process for monocycle reactivation/redispersion and eliminates the need, as practiced in the prior art, for rigorous, extended multi-cycle hydrogen/halogen treatment to achieve high redispersion values.

Catalysts which can be treated by the subject process include generally, iridium and selenium containing catalysts, with and without co-catalysts, preferably being supported. Other metallic co-catalysts, which can be present with iridium, which are applicable in the process, include metals such as, for example, platinum, rhodium, rhenium, palladium, mixtures thereof and the like. The metals can be present in bimetallic, trimetallic combinations and higher combinations, as alloys, or physical mixtures, on the same support particles or where the metals are individually present on separate support particles. Preferred metal combinations in the catalyst for treatment by the subject process are platinum-iridium, and platinum-iridium-rhenium.

A general description of the catalysts useful in the present process is adequately presented in U.S. Pat. No. 4,166,046 to Paul E. Eberly, Jr. (assigned to Exxon Research & Engineering Co.) together with preparative procedures for the catalysts and properties thereof and is hereby incorporated by reference for this purpose.

The amount of selenium present in the catalyst present as the free metal, salt, or compound thereof, ranges from about 0.001 to 3 percent, based on the weight of the total catalyst, and preferably about 0.01 to 1 weight percent.

The selenium is preferably incorporated into the catalyst by the surface impregnation procedure described in the above-identified patent and the compounds suitable for the addition of selenium to the catalyst composite are selenium monochloride, selenium disulfide, selenium sulfuroxy tetrachloride, selenous acid, selenic acid, selenium tetrachloride, and the like.

The presence of selenium does not generally adversely affect the efficiency of the iridium redispersion and generally the reforming activity of the regenerated and redispersed catalyst is substantially the same as freshly prepared catalyst containing the same level of selenium, and generally no significant loss of selenium from the catalyst is observed during redispersion.

The metals can be supported on a suitable support, which is conventional, with the proviso that the support is stable during the pretreatment process and does not undergo any deleterious reactions. Representative examples include silica, zeolites, clays, alumina, silica-alumina, zirconia, alumina-zirconia, mixtures thereof and the like. In general, the active metallic components, if supported, are present in an amount of preferably up to about 10 weight percent of the supported catalyst.

A preferred catalyst which can be reactivated in the process is agglomerated platinum-iridium containing selenium, and preferably supported on alumina.

By the term, "agglomerated catalysts", as used herein, is meant a supported or unsupported catalyst containing metallic iridium singly, or in combination with other metals described herein, in the agglomerated state, sufficient to reduce the catalytic activity of the metal catalyst. The agglomerated metal, e.g., metallic iridium, can be present due to the result of oxygen burn-off of coke deposits producing agglomerated iridium oxide which then must be reduced to metallic iridium by hydrogen gas. Also, hydrogen stripping at high temperature, preferably about 450° to 600° C., will result in partial removal of coke deposits and leave the agglomerated iridium in a metallic state. The metallic iridium in the agglomerated catalyst will undergo effective redispersion by the process described herein. Where the catalyst additionally contains iridium oxide, a hydrogen reducing step is necessary to convert the iridium oxide to metallic iridium prior to redispersion.

The agglomerated metallic iridium-containing catalysts operable in the process can be completely or partially decoked as described above by separate oxygen or hydrogen treat steps or not decoked at all, but simply removed from an on-stream process, e.g., reforming in the presence of hydrogen gas at elevated temperature and subjected to the described process herein.

Agglomerated, coked catalysts are usually industrially decoked by an oxygen burn-off of carbon deposits. Generally, a typical used catalyst from industrial operation may contain up to about 6 weight percent of carbon deposits and may be agglomerated after the decoking step up to about a 100 percent extent, as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates may be greater than about 50 Å and up to about 100 Å and greater in crystallite size. Decoking of the catalyst can be conducted under a variety of conditions, but is generally conducted by heating in an atmosphere containing 0.01 to 10 volume percent $O_2$ at a temperature of about 400° to 550° C., to remove surface and embedded carbon deposits and particularly, "active" carbon deposits which can react with halogen during the redispersion step to form halogenated species which are not readily removed from the catalyst surface. Generally, about 60 to 100 weight percent of carbon deposits can be removed in the decoking step. For example, U.S. Pat. No. 3,904,510 describes a typical procedure employed in decoking. The subject process is applicable to a wide range of agglomerated catalysts containing varying amounts of remaining carbon deposits, different degrees of agglomeration, varying particle size ranges and varying impurities.

An optional first step in the subject process is wherein said partially or completely decoked agglomerated catalyst is treated with a reducing atmosphere, generally comprising hydrogen gas, to reduce primarily metal oxides and oxide layers which may be present on agglomerated metallic iridium particles formed during decoking and as a further aid in removing residual active carbon deposits from the decoking step. If no metallic oxides are present, then the reduction step, as described herein, is not mandatory. However, if metallic oxides are present, the reduction step must be conducted in order to achieve high values of redispersion. Other reducing or inert gases may also be present, including nitrogen, helium and the like. The reducing step is generally conducted by contacting the catalyst at an elevated temperature, generally in the range of about 250° to 600° C., preferably about 300° to 540° C. in a reducing atmosphere comprising about one volume percent hydrogen gas or above, for a time to substantially reduce metal oxides present to the free metal, as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns, as taken on the same catalysts used in reforming, from which coke has been burned in numerous cycles of use, generally show distinct metal lines which indicate highly agglomerated metal particles of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas in a reducing atmosphere comprising essentially hydrogen, at a volume concentration of 0.05 to 5 volume percent, and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75 to 100 percent and preferably about 90 to 100 percent. Generally, time requirements for the reduction will be in the range from about one to several hours, depending on the process conditions. Shorter and longer times are also applicable.

Following the reduction step, if performed, the decoked-reduced catalyst is then subjected to halide pretreatment with a halide-providing compound and by the term is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof and the like. When using haloorgano compounds, hydrogen, in a large excess over the stoichiometric amount, must also be used to convert the haloorgano compound to a hydrogen halide.

The hydrogen halides can be hydrogen fluoride, hydrogen chloride, hydrogen bromide, or hydrogen iodide. Preferably, hydrogen chloride is the halide-providing compound used in the process. The atmosphere contacting the catalyst in this step can contain other inert gases, e.g., nitrogen and the like, and also including water vapor for more uniform distribution of halide on the catalyst surface prior to the halogenation treatment, and also preferably hydrogen gas or reducing gas, in an amount of about 1–2 volume percent to insure that the reduced catalyst remains in the reduced state during hydrogen halide pretreatment. In an alternate embodiment, the hydrogen reduction step can be conducted concurrently with the hydrogen halide pretreat step using the combined conditions of each step as described herein. It is essential that the atmosphere be substantially elemental oxygen-free during the halide pretreatment. Within this context, the halide feedstream should also preferably be elemental halogen-free since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen being present.

The temperature of the halide pretreatment is generally conducted in the range of about 250° to 600° C. and preferably about 300° to 540° C., and the halide-providing compound, at the above-identified temperature, is contacted with the catalyst in a gaseous stream until about 1.3 weight percent halide or above, is provided to the catalyst as detected, for example, by X-ray fluorescence. Preferably, the catalyst is pretreated to a range of about 1.4 to 2.5 weight percent halide, or higher, most preferably up to saturation by halide of the catalyst surface under the process conditions and maintained at a saturated halide level throughout the subsequent redispersion under the process conditions. As described hereinabove, the weight percentage of halide provided to the catalyst is taken as about 1.3 weight percent, said catalyst taken on a dry and coke-free basis. Where the catalyst has been extensively used in commercial processes, having a lower surface area and catalytic activity as a result of this continued use, a minimum weight percentage of about one percent halide is reasonably believed to be effective in promoting high redispersion values in the subject process. For example, fresh catalysts having BET surface areas of 180 $m^2/g$ and higher, will require 1.3 weight percent halide and above. Used catalysts having surface areas of about 100 to 180 $m^2/g$ will generally require a minimum of 1 to 1.3 weight percent halide prior to redispersion. However, an exact minimum value cannot be stated for a commercial spent catalyst, due to large variances in surface area, coke deposits, impurities and poisons present, and the like. One skilled in the art, however, will be able to utilize this disclosure successfully for efficient redispersion. It is important that the halide content be maintained up to the hydrogen halide/oxygen redispersion treatment. If a "purge" of hydrogen, nitrogen, water, mixtures thereof, or other materials is used subsequent to the halide pretreatment, then such purge or contacting should not reduce the halide level to below about 1.3 weight percent. If this happens, then the halide pretreatment should again be conducted to insure about 1.3 weight percent halide or above, being present. This is particularly true in cases where multi-cycle treatment may be necessary in which the weight percent of halide present on the catalyst must be replenished again to about 1.3 weight percent or above, prior to each hydrogen halide/oxygen redispersion treatment.

The halide pretreatment is conducted for sufficient time to achieve a halide loading, as described above. In practice, a fast flowing stream of preferably hydrogen chloride is contacted with the catalyst up to, and slightly beyond breakthrough. By the term "breakthrough" is meant the first visible detection by an analytical method such as, for example, the color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients" which can lead to non-uniform redispersion. In general, water vapor present in the halide feedstream will tend to lower the halide loading slightly below that compared to a dry halide application, by approximately about 0.4 weight percent, but generally results in a more uniform halide distribution. Thus, saturation by dry HCl of a coke-free, dry catalyst will result in up to about a 2.8 weight percent halide loading, whereas saturation with a wet stream of HCl will result in up to about 2.4 weight percent, or even slightly lower, halide loading. Preferably, the HCl treatment is conducted under dry conditions.

Time required for the halide pretreatment will, of course, be dependent on many factors including flow rate, hydrogen halide gaseous concentrations, amount of catalyst and can be desirably adjusted, for example, to run for about 1 to 3 hours per catalyst regeneration in general. Concentration of hydrogen halide can be from 0.05 to about 5 volume percent, or higher, in the feedstream, which can be at a total pressure of about 0.1 to 2.0 MPa. Higher and lower values of both variables can also be used effectively.

Following the halide pretreatment step, the catalyst is then subjected to a hydrogen halide/oxygen redispersion step by contacting the catalyst with a mixture of hydrogen halide and oxygen. Hydrogen halide gases applicable are hydrogen fluoride, hydrogen chloride, hydrogen bromide and hydrogen iodide with hydrogen chloride being a preferred embodiment.

The redispersion step is generally carried out at a temperature of about 450° to 600° C. and preferably about 500° to 540° C.

The hydrogen halide/oxygen atmosphere in the redispersion generally contains oxygen/hydrogen halide in a volume ratio of about 1:5 to 100:1, preferably about 2:1 to 60:1, and most preferably about 4:1 to 20:1. The elemental oxygen also acts to remove residual carbon deposits from the decoking step. However, the presence of oxygen is necessary in the metal redispersion process.

The gaseous hydrogen halide/oxygen atmosphere may also contain inert gases such as nitrogen or helium as carrier gases, carbon dioxide present from combustion processes, and also water vapor. Preferably, water is not present, but if present, is in an amount of about 0.05 to 2 volume percent.

Concentration of hydrogen halide in the feedstream can be at a partial pressure of about 0.00005 to 1.0 MPa. Higher and lower values of the partial pressure can also be used effectively. The redispersion is generally conducted until oxygen breakthrough occurs, as evidenced or detected, for example, by an oxygen analyzer. Generally, this requires about 0.5 to 2 hours of treatment for used catalyst, which depends upon flow rate, preferably being below a space velocity of about 4000 v/v/hr., concentrations of hydrogen halide and oxygen in the feedstream and amount of catalyst. Generally, however, slightly longer times of treatment are required for substantially complete redispersion, as evidenced by the absence of crystalline metal or metal oxide lines in the X-ray diffraction patterns. Preferably, a time of about 30 to 90 minutes past breakthrough, i.e., substantially past breakthrough, is necessary for substantially complete redispersion.

Operation past breakthrough of the hydrogen halide/oxygen feedstream is preferred to avoid redispersion gradients along the catalyst bed of redispersed iridium metal. Where gradients are present, usually percent redispersion regions of iridium metal are high at the back part (exit) of the reactor but decrease towards the front (entrance) of the reactor.

In a commercial reforming unit, in which the gaseous feeds are recirculated, the desired oxygen volume concentration cannot be immediately obtained and therefore, the introduction of oxygen into the HCl feedstream after the halide pretreatment step, is generally carried out in a stepwise or continuous manner of increasing oxygen volume percentage concentrations until the desired oxygen volume concentration is reached.

After the desired oxygen volume concentration is reached, the redispersion is then carried out to achieve substantial iridium and platinum redispersion.

At the end of the redispersion step, the catalyst chamber can be closed, the gaseous feedstream stopped, and the catalyst allowed to "soak" in the HCl/oxygen atmosphere for a period of time to allow catalyst sampling to be performed and to insure high degrees of redispersion.

By carrying our the process described herein, substantially complete redispersions of iridium and selenium containing catalysts described herein can be achieved and particularly those of platinum-iridium on alumina used in hydrocarbon reforming operations. In the latter case, 75 to 100 percent redispersion of both the platinum and iridium agglomerated metals can be achieved in the process. The number of cycles necessary should preferably be one. However, in certain cases such as where minimum treatment past oxygen breakthrough is desired, multi-cycle treatment may prove necessary with concomitant need for additional pretreatment steps, as described herein above.

By the term "substantially complete redispersion" as used herein, is meant redispersion values, as determined by X-ray diffraction, of greater than about 55 numerical percent and preferably about 75 to 100 numerical percent of iridium on the catalyst surface, also including other metals where present.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of the halide content to about 1.0 weight percent is carried out prior to the actual reforming process since excess halide, at this stage, leads to cracking of the liquid hydrocarbon fraction to undesirably smaller hydrocarbon fragments. This reduction can be accomplished by a wet hydrogen stream, for example, which also serves to convert all of the metal species present after redispersion to the metallic state prior to use in a reforming process.

The following examples are illustrative of the best mode of carrying out the instant invention, as contemplated by the inventors, and should not be construed as being limitations on the scope or spirit of the instant invention.

EXAMPLE 1

Into a quartz tubular, horizontal reactor was charged about 60 grams of a coke-free platinum-iridium-selenium on alumina catalyst, containing 0.3 wt.% Ir, 0.3 wt.% Pt and 0.025 wt.% Se, and prepared by the general method described in U.S. Pat. No. 4,166,046, hereby incorporated by reference herein for that purpose, wherein 100% of the iridium was agglomerated. The catalyst was divided into three approximately equal sections with quartz wool plugs as spacers between the sections. The catalyst in Section 1 (S-1 in the Table) was at the entry of the reactor and the catalyst in Section 3 (S-3 in the Table) was at the reactor exit. The chloride level on this catalyst was 0.82 weight percent, as determined by X-ray fluorescence.

The catalyst was treated with a gaseous mixture of 20 percent hydrogen in helium at one atmosphere for 2 hours at 520° C., at a flowrate of 500 cc/minute. The hydrogen was purged from the catalyst bed with helium. The catalyst was then treated with a gaseous mixture of 2.3 volume percent hydrogen chloride in helium at about 520° C. at 500 cc/min. for a total of about 91 minutes. At this point, 2.5 volume percent of oxygen was added to the gaseous mixture and the HCl/O$_2$ treatment was conducted for about 22 minutes. The concentration of the oxygen was then increased in four about equal steps to a final concentration of 11.7 volume %. The three intermediate steps were at 3.7, 4.0, and 5.0 O$_2$ volume percentages, each held for about 20 minutes before progressing to the next higher concentration. After the O₂ concentration reached 11.7 volume percent, the HCl/oxygen feedstream was continued for 70 minutes. Then the reactor was blocked off at the inlet and outlet and the catalyst was "soaked" in the HCl/oxygen atmosphere for 3 hours at the same temperature. Results are given in Table I below for the resulting iridium redispersion in catalyst bed sections 1, 2, and 3.

TABLE I

|  | Prior to Process treatment | After Process | | |
|---|---|---|---|---|
|  |  | Section (1) | Section (2) | Section (3) |
| % Ir Agglomeration | 100 | 0 | 0 | 0 |
| % IrO₂ Agglomeration | — | 0 | 0 | 0 |
| % Total Ir Agglomeration | — | 0 | 0 | 0 |
| % Ir Redispersion | — | 100 | 100 | 100 |
| % Chloride on Catalyst | 0.82ᵃ | 1.94ᵇ | 1.93ᵇ | b |

ᵃinitial
ᵇdetermined after run.

EXAMPLE 2

The procedure of Example 1 was repeated on a catalyst containing 0.3 wt.% iridium, 0.3 wt. % platinum and 0.081% Se, based on the total weight of the catalyst. The catalyst was prepared by the general procedure described in U.S. Pat. No. 4,166,046. Iridium agglomeration in this catalyst was initially 100%.

The redispersion treatment procedure used was substantially the same as Example 1 except that the initial oxygen concentration during the HCl+O₂ treat was 3.4 vol.%. The oxygen concentration was increased in four steps to a final concentration of 12 vol.%. The intermediate oxygen concentrations were 4.9, 6.3 and 10 vol.%. The results are given the Table 2 below.

TABLE 2

|  | Prior to Process treatment | After Process Treatment | | |
|---|---|---|---|---|
|  |  | Section (1) | Section (2) | Section (3) |
| % Ir Agglomeration | 100 | 0 | 0 | 0 |
| % IrO₂ Agglomeration | — | 0 | 0 | 0 |
| % Total Ir Agglomeration | — | 0 | 0 | 0 |
| % Ir Redispersion | — | 100 | 100 | 100 |
| % Chloride on Catalyst | 0.82ᵃ | 1.91ᵇ | 1.97ᵇ | 1.88ᵇ |

ᵃinitial
ᵇdetermined after run

The data in Tables 1 and 2 indicate that substantially complete iridium redispersion was obtained with the invention process in one treat cycle in which the catalyst contained a selenium moderator agent.

What is claimed is:

1. A process for reactivating a partially or completely decoked agglomerated catalyst containing metallic iridium and selenium comprising the steps of:
   (a) pretreating said iridium and selenium-containing catalyst by contact with a substantially elemental oxygen-free atmosphere comprising a halide-providing compound at elevated temperature to provide about 1.3 weight percent and above, halide to the catalyst, taken as the coke-free, dry catalyst; and
   (b) redispersing the metallic iridium from step (a), while maintaining said 1.3 weight percent halide provided to the catalyst, by contact with an atmosphere comprising hydrogen halide and elemental oxygen at elevated temperature at an oxygen:hydrogen halide volume ratio of about 1:5 to 100:1 and a hydrogen halide partial pressure of about 0.00005 to 0.1 MPa for a time sufficient to effect a substantial redispersion of said metallic iridium.

2. The process of claim 1 wherein said catalyst is initially present substantially as agglomerated metallic iridium.

3. The process of claim 1 wherein said catalyst is present on a catalyst support selected from silica, zeolite, alumina, silica-alumina, zirconia, alumina-zirconia, and mixtures thereof.

4. The process of claim 1 wherein said catalyst further contains a metal co-catalyst selected from platinum, rhodium, rhenium, palladium and mixtures thereof.

5. The process of claim 1 wherein said halide-providing compound is one which generates a hydrogen halide in the presence of hydrogen gas.

6. The process of claim 5 wherein said halide-providing compound is selected from carbon tetrachloride, chloroform, methylene chloride, methylchloride, 1,2-dichloroethane, hexachloroethane, and mixtures thereof, in the presence of hydrogen gas.

7. The process of claim 1 wherein said halide-providing compound is hydrogen chloride.

8. The process of claim 1 wherein said halide is present on the catalyst after step (a) in an amount of about 1.4 to 2.5 weight percent, taken as the coke-free, dry, catalyst.

9. The process of claim 1 wherein said catalyst after completion of step (a) is saturated with halide.

10. The process of claim 1 wherein said catalyst is platinum-iridium-selenium supported on alumina.

11. The process of claim 1 wherein said catalyst is platinum-iridium-rhenium-selenium supported on alumina.

12. The process of claim 1 wherein the temperature in step (a) is in the range of about 250° to 600° C.

13. The process of claim 1 wherein said hydrogen halide in step (b) is hydrogen chloride.

14. The process of claim 1 wherein said elemental oxygen and hydrogen halide are present in a respective volume ratio of about 2:1 to 60:1.

15. The process of claim 1 wherein said temperature in step (b) is in the range of about 450° to 600° C.

16. The process of claim 1 wherein said metallic iridium is 75 to 100 percent redispersed.

17. The process of claim 1 wherein said catalyst further contains iridium oxide which is contacted with a reducing atmosphere at elevated temperature to substantially convert said iridium oxide to metallic iridium prior to or concurrently with step (a).

18. The process of claim 17 wherein said reducing atmosphere comprises hydrogen gas.

19. The process of claim 17 wherein the temperature during said contacting with said reducing atmosphere is in the range of about 250° to 600° C.

20. A process for reactivating partially or completely decoked agglomerated platinum-iridium-selenium on alumina catalyst containing platinum, iridium oxides and selenium comprising the steps of:
   (a) contacting said selenium containing agglomerated catalyst with a hydrogen atmosphere at a temperature in the range of about 300° to 540° C. and a pressure of about 0.1 to 2.0 MPa for a sufficient time to substantially convert said oxides of platinum and iridium to the respective metals;

(b) pretreating the catalyst from step (a) by contact with an elemental oxygen-free atmosphere comprising hydrogen chloride at a temperature in the range of about 300° to 540° C. and a pressure of about 0.1 to 2.0 MPa to saturate the catalyst with chloride; and (c) redispersing the metallic platinum and iridium while maintaining a saturated catalyst chloride level from step (b) by contact with an atmosphere comprising hydrogen chloride and elemental oxygen in an oxygen/hydrogen chloride volume ratio of about 4:1 to 20:1, at a temperature in the range of about 500° to 540° C. for a sufficient time to effect about a 75 to 100 percent redispersion of both metallic platinum and iridium.

21. A process for reactivating an agglomerated metallic platinum-iridium-selenium on alumina catalyst, which has been partially decoked by hydrogen gas, comprising the steps of:

(a) pretreating said selenium-containing catalyst by contact with an elemental oxygen-free atmosphere comprising hydrogen chloride at a temperature in the range of about 300° to 540° C. and a pressure of about 0.1 to 2.0 MPa to saturate the catalyst with chloride; and (b) redispersing the metallic platinum and iridium while maintaining a saturated catalyst chloride level from step (a) by contact with an atmosphere comprising hydrogen chloride and elemental oxygen in an oxygen/hydrogen chloride volume ratio of about 4:1 to 20:1, at a temperature in the range of about 500° to 540° C. for a sufficient time to effect about a 75 to 100 percent redispersion of both metallic platinum and iridium.

* * * * *